(No Model.)

S. MITCHELL.
METHOD OF MAKING STEEL TRAP SPRINGS.

No. 395,846. Patented Jan. 8, 1889.

UNITED STATES PATENT OFFICE.

SAMUEL MITCHELL, OF SOUTHINGTON, CONNECTICUT.

METHOD OF MAKING STEEL-TRAP SPRINGS.

SPECIFICATION forming part of Letters Patent No. 395,846, dated January 8, 1889.

Application filed June 11, 1888. Serial No. 276,702. (No model.)

*To all whom it may concern:*

Be it known that I, SAMUEL MITCHELL, residing at Southington, in the county of New Haven and State of Connecticut, have invented certain new and useful Improvements in the Method of Making Steel-Trap Springs; and I do declare the following to be a full, clear, and exact description of the same, reference being had to the accompanying drawings, which form a part of this specification.

My invention relates to an improved method of making steel-trap springs, the object being to greatly reduce the cost of producing them.

With this end in view my invention consists in cutting, straightening, and heating worn-out steel carriage or wagon wheel tires, then hot-rolling them to the thickness required for the springs, then working the strips so formed into trap-spring blanks, then perforating the ends of such blanks, or reaming out or enlarging such openings as may be in their ends, then heating each blank about midway of its length and bending it, then tempering them in water, and then dipping them in oil and burning the adhering film thereof off, those portions of the strips having unobliterated nail-holes being utilized in the ends of the blanks.

Figure 1:
Figure 2:
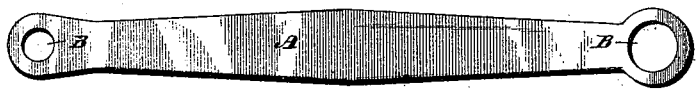
Figure 3:
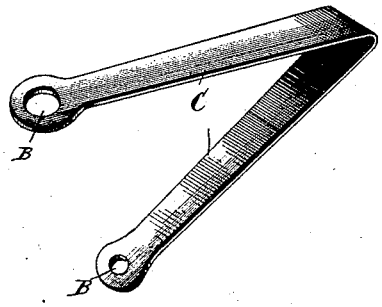

In the accompanying drawings, Figure 1 is a plan view of a trap-spring blank as it appears when first died out of the rolled wagon-tire stock. Fig. 2 is a similar view showing the same blank developed by perforating its ends, and Fig. 3 is a perspective view of a steel-trap spring made under my invention.

In carrying out my improved method old and worn-out steel wagon and carriage wheel tires of all descriptions may be used. Such tires are first cut, so as to enable them to be straightened out. The straightened tires are then heated and hot-rolled to reduce them to the thickness required for the springs which they are to be worked up into. This rolling operation flattens and widens the tires, increases them in length, and, according to the degree to which it is carried, nearly or quite obliterates the nail-holes in them. The rolled strips so produced are then run through a press and worked up into trap-spring blanks A. In working up the strips those portions of the strips containing incompletely-obliterated nail-holes may be utilized for the ends of the blanks. The ends of the blanks so formed are then perforated, as at B B, or, if they already have openings, such are reamed out or enlarged. The blanks are then heated, each at a point about midway of its length. Then when hot they are bent over almost double and tempered in water to form the springs C. Then the temper so obtained is drawn by dipping the springs in oil and burning off the adhering film thereof. The springs are now ready for use.

The springs so made are of excellent quality and well adapted for their use. They are, moreover, very cheap, for the old tires, containing exactly the right quality of steel for the purpose in hand, may be bought and worked over, under the method described, at much less expense than is involved in buying and working up manufactured stock.

Having fully described my invention, what I claim as new, and desire to secure by Letters Patent, is—

A method of making steel-trap springs, consisting in cutting, straightening, and heating worn-out steel wagon and carriage wheel tires, then hot-rolling them to the thickness required for the springs, then working the strips so formed into trap-spring blanks, then perforating the ends of the blanks, or reaming out or enlarging such openings as may be in their ends, then heating each blank about midway of its length and bending it, then tempering them in water, and then dipping them in oil and burning off the adhering film thereof, those portions of the strips having unobliterated nail-holes being utilized in the ends of the blanks, substantially as set forth.

In testimony whereof I have signed this specification in the presence of two subscribing witnesses.

SAMUEL MITCHELL.

Witnesses:
CHAS. B. SHUMWAY,
WILLIAM HARRISON.